United States Patent [19]

Flanagin et al.

[11] Patent Number: 6,128,661
[45] Date of Patent: Oct. 3, 2000

[54] INTEGRATED COMMUNICATIONS ARCHITECTURE ON A MOBILE DEVICE

[75] Inventors: Steve Flanagin; Stephen Hou; George Hu, all of Redmond; Haresh G. Ved, Bellevue, all of Wash.

[73] Assignee: Microsoft Corporation, Redmond, Wash.

[21] Appl. No.: 09/058,685

[22] Filed: Apr. 10, 1998

Related U.S. Application Data

[60] Provisional application No. 60/063,164, Oct. 24, 1997, and provisional application No. 60/064,986, Nov. 7, 1997.

[51] Int. Cl.[7] ............................................. G06F 15/16
[52] U.S. Cl. ......................... 709/227; 709/217; 709/219; 709/228
[58] Field of Search ................................. 709/217, 219, 709/227, 228

[56] References Cited

U.S. PATENT DOCUMENTS

| | | | |
|---|---|---|---|
| 5,337,044 | 8/1994 | Folger et al. | 340/825.44 |
| 5,392,390 | 2/1995 | Crozier | 395/161 |
| 5,414,844 | 5/1995 | Wang | 395/650 |
| 5,542,046 | 7/1996 | Carlson et al. | 395/186 |
| 5,564,070 | 10/1996 | Want et al. | 455/507 |
| 5,598,536 | 1/1997 | Slaughter, III et al. | 709/219 |
| 5,625,829 | 4/1997 | Gephardt et al. | 710/104 |
| 5,664,228 | 9/1997 | Mital | 395/882 |
| 5,666,530 | 9/1997 | Clark et al. | 707/201 |
| 5,666,553 | 9/1997 | Crozier | 395/803 |
| 5,684,990 | 11/1997 | Boothby | 395/619 |
| 5,717,737 | 2/1998 | Doviak et al. | 455/403 |
| 5,721,835 | 2/1998 | Niwa et al. | 395/281 |
| 5,727,159 | 3/1998 | Kikinis | 709/246 |
| 5,727,202 | 3/1998 | Kucala | 707/10 |
| 5,790,800 | 8/1998 | Gauvin et al. | 709/227 |
| 5,812,819 | 9/1998 | Rodwin et al. | 395/500 |
| 5,864,708 | 1/1999 | Croft et al. | 395/821 |
| 5,887,063 | 3/1999 | Vardharajan et al. | 380/21 |
| 5,896,369 | 4/1999 | Warsta et al. | 370/338 |
| 5,918,016 | 6/1999 | Brewer et al. | 709/220 |

FOREIGN PATENT DOCUMENTS

| | | |
|---|---|---|
| WO 94 15294 | 7/1994 | WIPO . |
| WO 97 23853 | 7/1997 | WIPO . |
| WO 97 25665 | 7/1997 | WIPO . |

*Primary Examiner*—Zarni Maung
*Assistant Examiner*—Saleh Najjar
*Attorney, Agent, or Firm*—Westman, Champlin & Kelly, P.A.

[57] ABSTRACT

A system and method of interaction between a computer, such as a desktop computer, and a mobile device include storing an identifier on the mobile device and the computer. A set of settings are stored in the computer referenced to the identifier for the mobile device. A connection method is selected from a plurality of connection methods. Upon connection of the mobile device to the computer pursuant to the selected method, the identifier stored in the mobile device is compared with the identifier stored on the computer. Interaction between the connected mobile device and the computer is controlled as a function of the stored set of settings if corresponding identifiers are found.

31 Claims, 11 Drawing Sheets

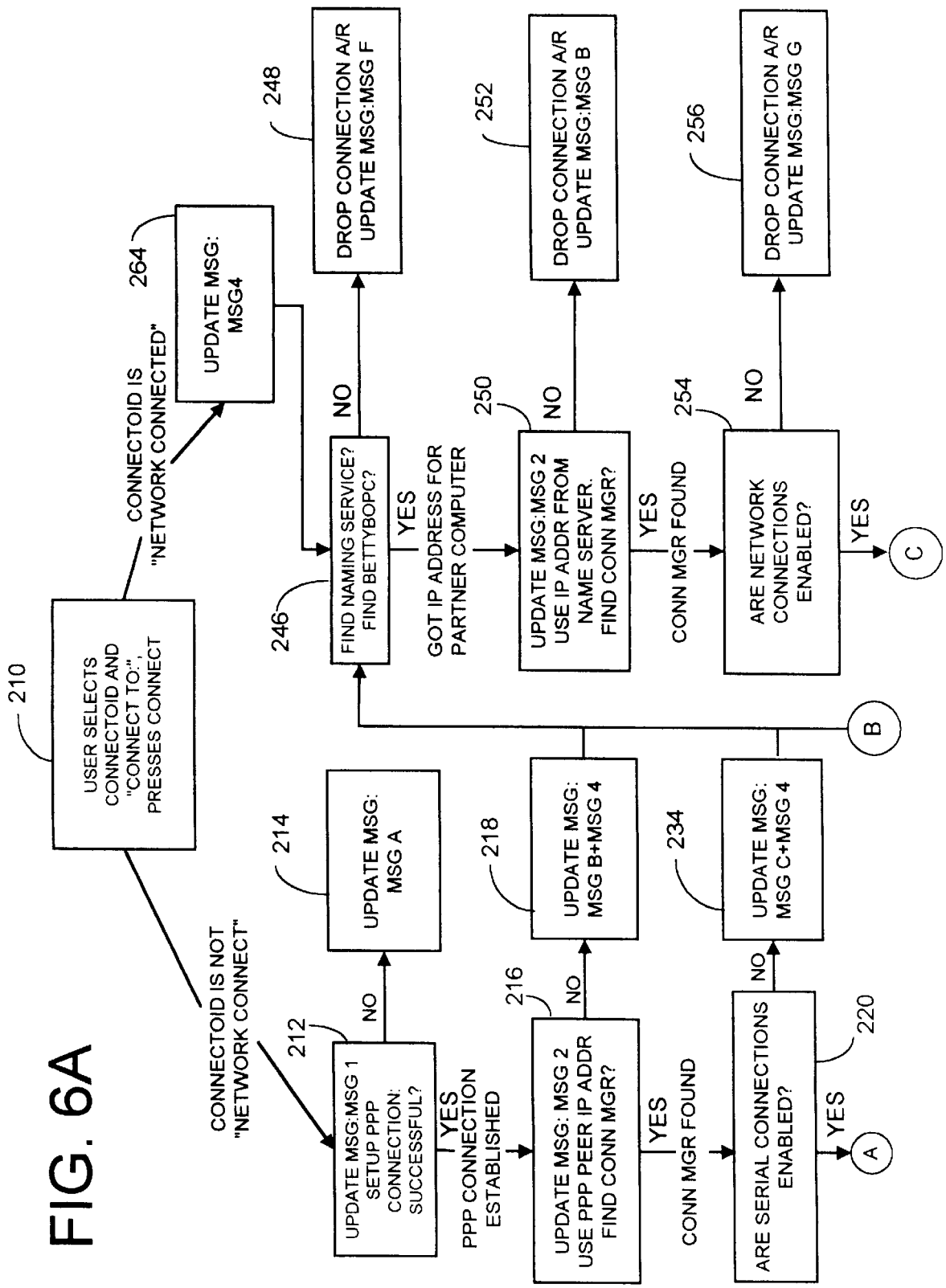

FIG. 6C

Table 1

| Msg# | Description |
|------|-------------|
| Msg1 | "Establishing connection to desktop PC. Please wait..." |
| Msg2 | "PC contacted. Locating connection agent. Please wait..." |
| Msg3 | "Checking for partnership with this computer. Please wait..." |
| Msg4 | "Locating<Connect to:>"(where <Connect to:> is the selected partner computer.) |
| MsgA | "Unable to establish connection." |
| MsgB | "Connection agent not found on this computer." |
| MsgC | "Serial connections disabled on this computer." |
| MsgD | "No partnership established with this computer." |
| MsgE | "Device name has changed since last connect and is no longer unique. Connection denied" |
| MsgF | "Unable to locate <Connect to:>." (where <Connect to:> is the selected partner computer.) |
| MsgG | "Network connections disabled on this computer." |

INTEGRATED COMMUNICATIONS ARCHITECTURE ON A MOBILE DEVICE

REFERENCE TO CO-PENDING PATENT APPLICATIONS

The present application claims priority from and fully incorporates herein, U.S. Provisional patent application Ser. No. 60/063,164, filed on Oct. 24, 1997, and U.S. Provisional patent application Ser. No. 60/064,986, filed on Nov. 7, 1997.

Reference is also hereby made to co-pending U.S. patent application, Ser. No. 09/058,528, filed on even date herewith, now abandoned, entitled "SYSTEM AND METHOD FOR INTERACTION BETWEEN A DESKTOP COMPUTER AND MULTIPLE MOBILE DEVICES" which has been assigned to the same assignee as the present application and is hereby fully incorporated by reference.

BACKGROUND OF THE INVENTION

The present invention relates to personal mobile computing devices commonly known as handheld portable computers. More particularly the present invention relates to a communications architecture on the mobile device that allows it to communicate with a computer, such as a desktop computer, using a selectable type of communication link from a plurality of available links.

Mobile devices are small electronic computing devices often referred to as personal desktop assistants. One such mobile device is the Handheld PC (or "H/PC") based on and including the Windows CE brand operating system sold by Microsoft Corporation of Redmond, Washington. Although small, a wide variety of computing tasks and applications can be performed by such mobile devices, such as word processing, spread sheet programs, personal money managers and games, to name a few. In many respects, these programs are very similar to programs that reside on an individual's desktop computer. In some applications, the mobile device may not have as many functions as are available on a desktop computer but, nevertheless, are quite valuable as a means for updating and changing data in the field.

It is also common for a mobile device to be used in conjunction with a desktop computer. For example, the user of a mobile device may also have access to, and use, a desktop computer at work or at home. The user may typically run the same types of applications on both the desktop computer and on the mobile device. Thus, it is quite advantageous for the mobile device to be designed to be coupled to the desktop computer to exchange information with, and share information with, the mobile device.

In known operating environments, the mobile device must be present at the desktop computer and use a serial link or an infrared link to exchange information with the desktop computer. This limitation is particularly disadvantageous when, for example, it is desired that the user or users from a remote location access different desktop computers or the same desktop computer. For instance, a sales force may individually want to interact with a designated desktop computer having a common database that is shared by all in the sales force. Each individual sales person would want to update each of their respective mobile devices so as to have the most current information in the database, or update the common database with information obtained in the field, without returning back to the location of the desktop computer. Prior art systems are not convenient to use since each user may have to reconfigure communication settings and data transfer parameters each time the user connects the mobile device to the desktop computer. In many situations, each of the users must be using the same type of mobile device and the same type of communication link.

There is a continuing need to improve the interaction between a desktop computer and such mobile devices. In particular, there is a need to allow the mobile device to connect to the desktop computer using any one of a plurality of different communication links so as to give the user flexibility, particularly when the mobile device is remote from the desktop computer. In addition, there is a need to allow a plurality of mobile devices to interact with the desktop computer without requiring an inordinate amount of configuration by the user to transfer data or form the communication link as well as allow the user to choose a particular communication link independent of other users interacting with the desktop computer

SUMMARY OF THE INVENTION

The present invention fulfills these needs by providing a system and a method of interaction between a computer, such as a desktop computer, and a mobile device including storing an identifier on the mobile device and the computer. A set of settings is stored in the computer referenced to the identifier for the mobile device. A connection method is selected from a plurality of connection methods. Upon connection of the mobile device to the computer pursuant to the selected method, the identifier stored in the mobile device is compared with the identifier stored on the computer. Interaction between the connected mobile device and the computer is controlled as a function of the stored set of settings if corresponding identifiers are found.

BRIEF DESCRIPTION OF THE DRAWINGS

FIGS. 6A and 6B illustrate a flow diagram which illustrates one preferred embodiment of establishing a communication link between a mobile device and a desktop computer in accordance with one aspect of the present invention.

FIG. 6C is a table of messages for the flow diagram of FIGS. 6A and 6B.

DETAILED DESCRIPTION OF THE PREFERRED EMBODIMENTS

Figure 1:
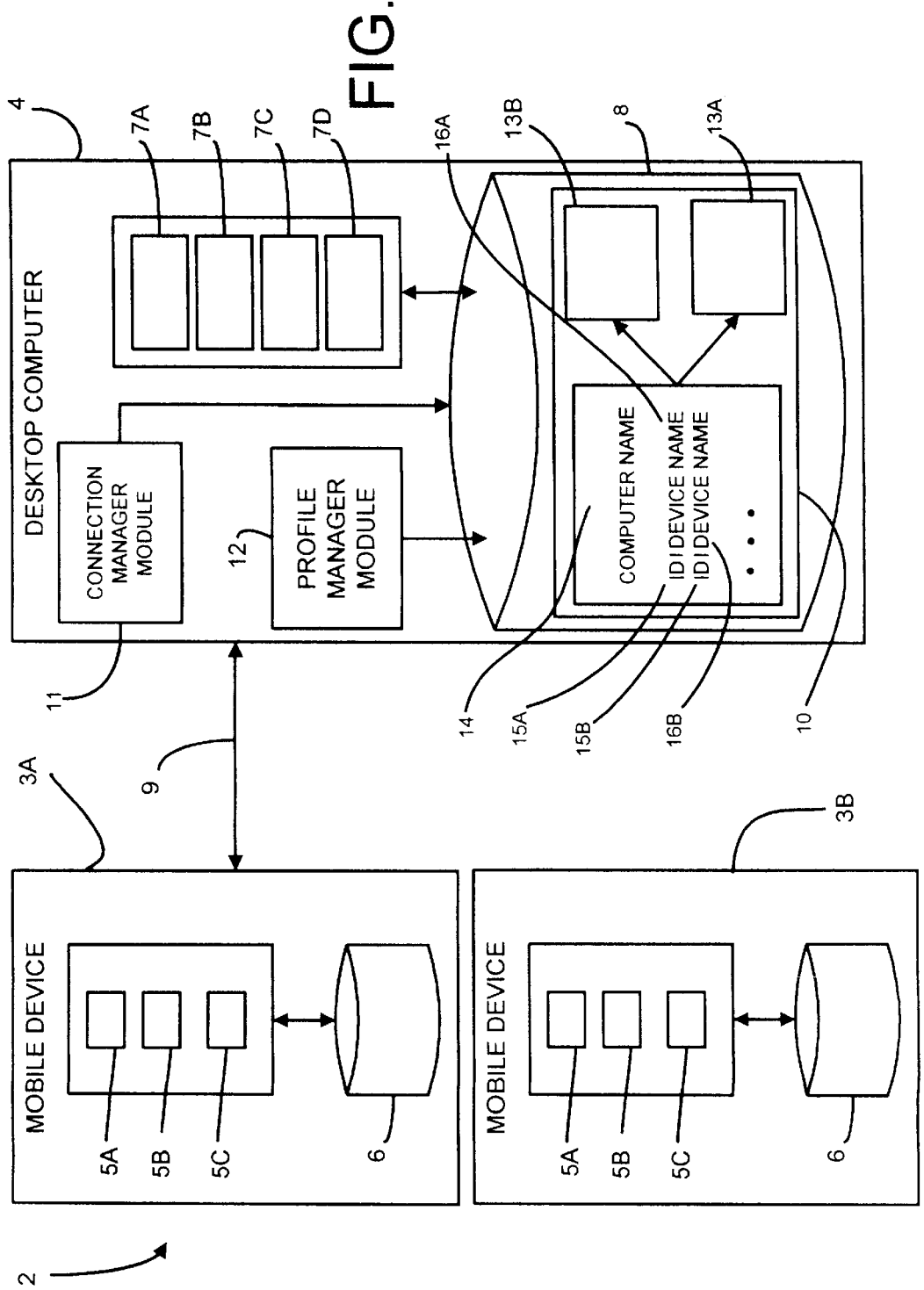
FIG. 1 is a block diagram illustrating an operating environment of the present invention.

FIG. 1 is a block diagram of a typical system or environment 2 in which the present invention operates. In the embodiment illustrated, the environment 2 includes a first mobile device 3A and a second mobile device 3B. Each of the mobile devices 3A and 3B includes one or more application programs indicated at 5A, 5B and 5C, and a store 6 used to store objects, data files and/or databases used by the application programs 5A–5C. A computer, herein illustrated as a desktop computer 4, also includes one or more application programs indicated at 7A, 7B, 7C and 7D, and a store 8 used to store objects, data files and/or databases used by the application programs 7A–7D. In some circumstances, it is desired that at least some of the objects on stores 6 and 8 be either copied or transferred in order that the user can access the same information regardless as to whether the mobile device or the desktop computer 4 is being used. Although illustrated wherein each mobile device 3A and 3B includes the same application programs 5A–5C, it should be understood that each mobile device 3A and 3B can be individually configured as desired by each respective user to contain one or a number of application programs, some of which can correspond to application programs 7A–7D residing on the desktop computer 4. It should also be understood that the mobile devices 3A and 3B need not be made from the same manufacturer, nor even identical to operate in the present environment 2. In other words, the mobile devices 3A and 3B can be manufactured by different vendors using different CPU platforms and having different operating characteristics.

One broad aspect of the present invention allows each of the mobile devices 3A and 3B to connect to the desktop computer 4 using any one of a plurality of communication links 9. In the embodiment illustrated, the mobile device 3A is connected to the desktop computer 4 using the communication link 9. Alternatively, when it is desired, the mobile device 3B can be connected to the desktop computer 4 using another communication link 9. Although illustrated wherein two mobile devices 3A and 3B can be connected to the desktop computer 4, if desired, additional mobile devices manufactured by the same or different vendors of mobile devices can also be connected to the desktop computer 4.

Generally, the desktop computer 4 also includes partnership information indicated at 10 that is stored in store 8. The partnership information 10 comprises settings or parameters to control aspects of the connection and data transfer process when each mobile device 3A and 3B is connected.

In one embodiment, the partnership information 10 corresponding to each mobile device 3A and 3B is stored on the desktop computer 4 and is accessed each time the user connects the mobile devices 3A and 3B thereto. Thus, each user need not have to reestablish his or her user preferences each time the mobile device 3A or 3B is connected. In a preferred embodiment, the partnership information 10 includes any unique settings for each unique type of mobile device being connected to the desktop computer 4. In this manner, the mobile devices 3A and 3B need not be the same type. The partnership information 10 can be stored remote from the desktop computer 4. If desired, some of the partnership information 10, for example, some or all of the user settings, can be stored on each of the respective mobile devices 3A and 3B, which would then be accessible by the desktop computer 4. Likewise, the partnership information 10 can also be stored, for example, on a network server that is accessible to the desktop computer 4. Typically, the partnership information 10 on the desktop computer 4 includes a record of the partnership with the mobile device and a module to access any relevant user setting pertaining to the partnership no matter where they are stored.

The partnership information 10 is preferably organized under unique identifiers stored at 15A and 15B assigned, for example, during initial formation of each partnership. The unique identifiers stored at 15A and 15B are stored on the desktop computer 4 and stored separately on each of the mobile devices 3A and 3B. In addition to the unique identifiers stored at 15A and 15B, device names can also be stored at 16A and 16B in the partnership information 10 along with the name of the computer 4 stored at 14. The partnership information 10 includes configuration settings for services used by the user to transfer or copy data between the connected mobile device 3A or 3B and the desktop computer 4 as well as data necessary to perform a service. As used herein, a "service" is a single or group of functions made available to the mobile device that connects to the desktop computer 4 with the service installed. For example, a "Synchronization Service" is a service that specializes in the transfer of data between the connected mobile device 3A and the desktop computer 4, including replications or automatic file copy. Other services include a file conversion service that converts files between the connected mobile device 3A or 3B and the desktop computer 4 (for example, when the user specifies that one or a plurality of files be separately copied) so that data files can be accessed by each respective application program residing thereon. Another service includes synchronizing time and date clocks of the connected mobile device 3A and the desktop computer 4.

A profile manager module 12 residing on the desktop computer 4 creates, stores and/or accesses the partnership information 10 in the store 8. In a preferred embodiment, the partnership information 10 is stored as individual profile areas 13A and 13B corresponding to each of the respective mobile devices 3A and 3B. In one embodiment, the profile areas 13A and 13B comprise registry subkeys and individual profile folders for storing partnership specific information for each service. A connection manager 11 controls connection of the mobile device 3A to the desktop computer 4 and accesses the partnership information 10 when necessary to check if a prior partnership has been formed. A separate connection manager 11 and profile manager module 12 are depicted for purposes of description only in that, if desired, a single module could perform both functions.

Figure 5:
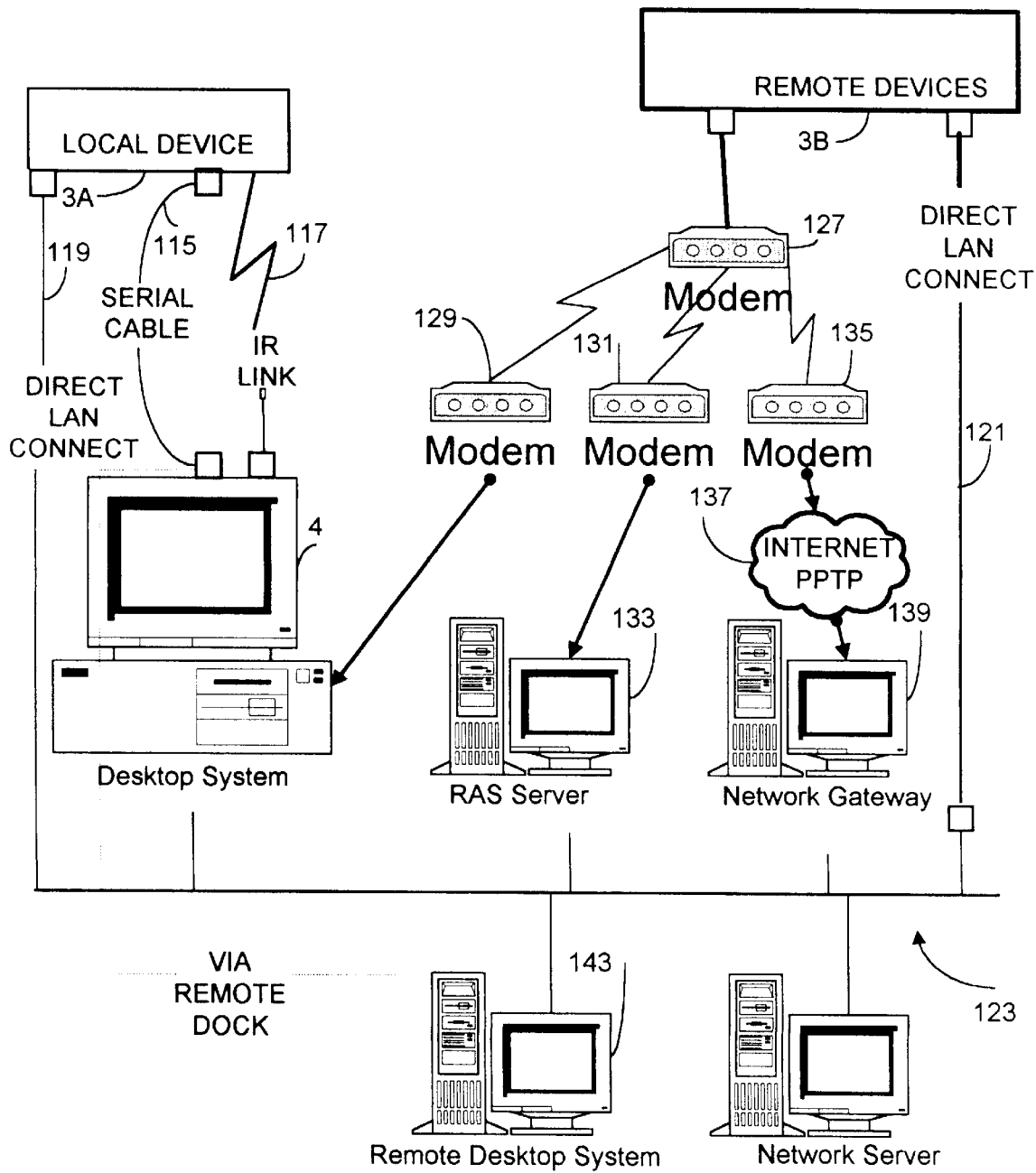
FIG. 5 is a pictorial illustrating various types of communication links formable with the present invention.

In one embodiment, new partnerships formed between the mobile devices 3A and 3B and the desktop computer 4 are formed through a direct serial connection such as illustrated in FIG. 5 at 115 or 117. Initial formation of the partnership between the desktop computer 4 and a mobile device using a direct "Local" connection may be preferred in order to control access to information, and hence, provide some security. However, once the partnership has been formed any one of the connection links discussed below can then be used.

Commonly, the desktop computer 4 includes a plurality of serial communication ports which can be used to form the local connection. In one embodiment, the connection manager 11 includes a suitable program module to allow the desktop computer 4 to ascertain which communication port is being used for connection to the mobile device 3A. The connection manager 11 toggles one of the signal lines forming the serial connection to "wake up" the mobile device 3A. The mobile device 3A then transmits a signal such as a unique string, which in effect, identifies the mobile device 3A and can be used to distinguish the mobile device 3A from any other device connectable to the serial port such as a scanner, a printer, or the like. Once the desktop computer 4 receives the unique string, the desktop computer 4 has determined which serial communication port is being used.

Before describing other aspects of the present invention, a brief description of the desktop computer 4 and a typical mobile device, such as mobile device 3A, will be helpful.

Figure 2:
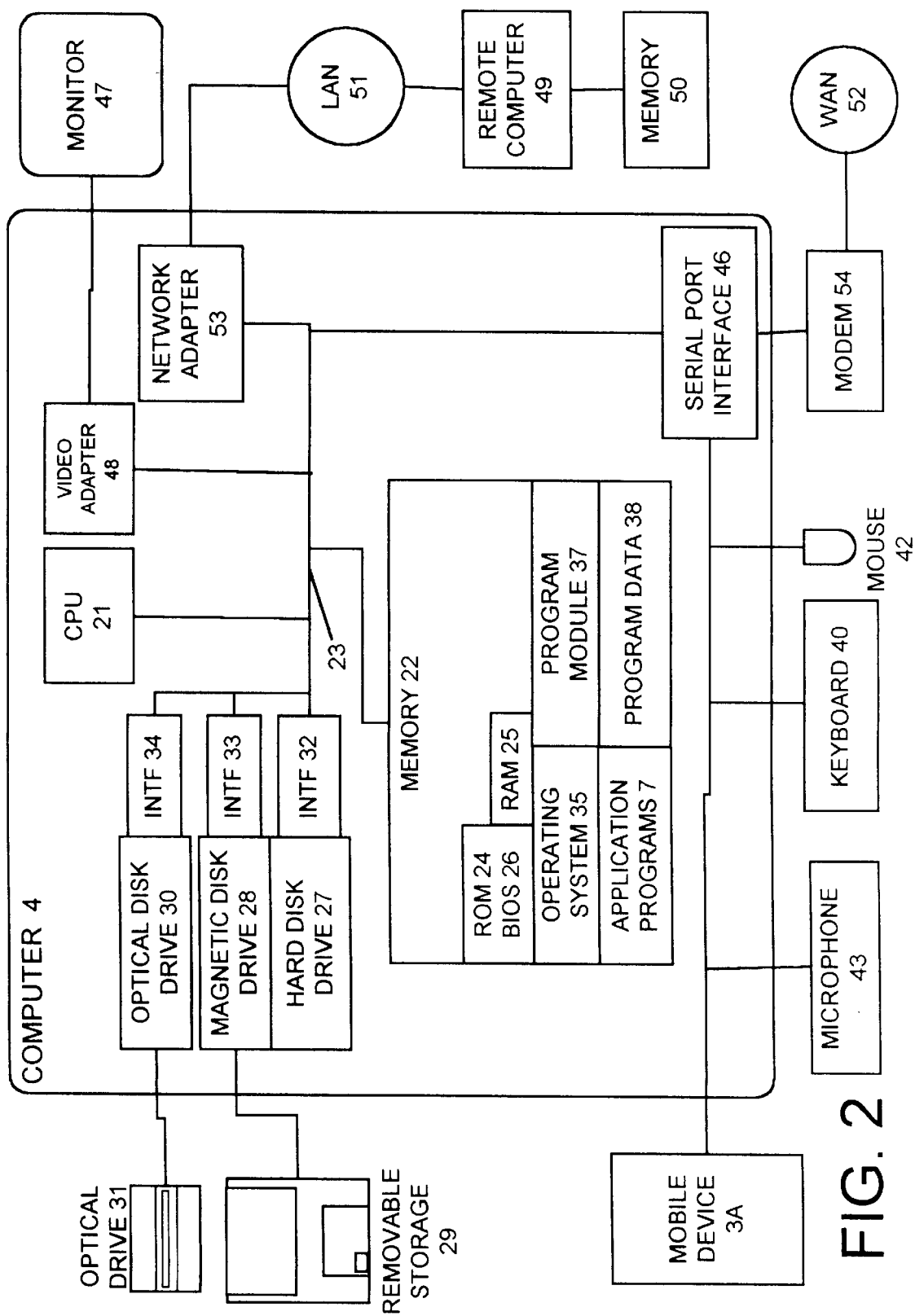
FIG. 2 is a block diagram of one embodiment of a conventional desktop computer used in conjunction with a mobile device.
Figure 3:
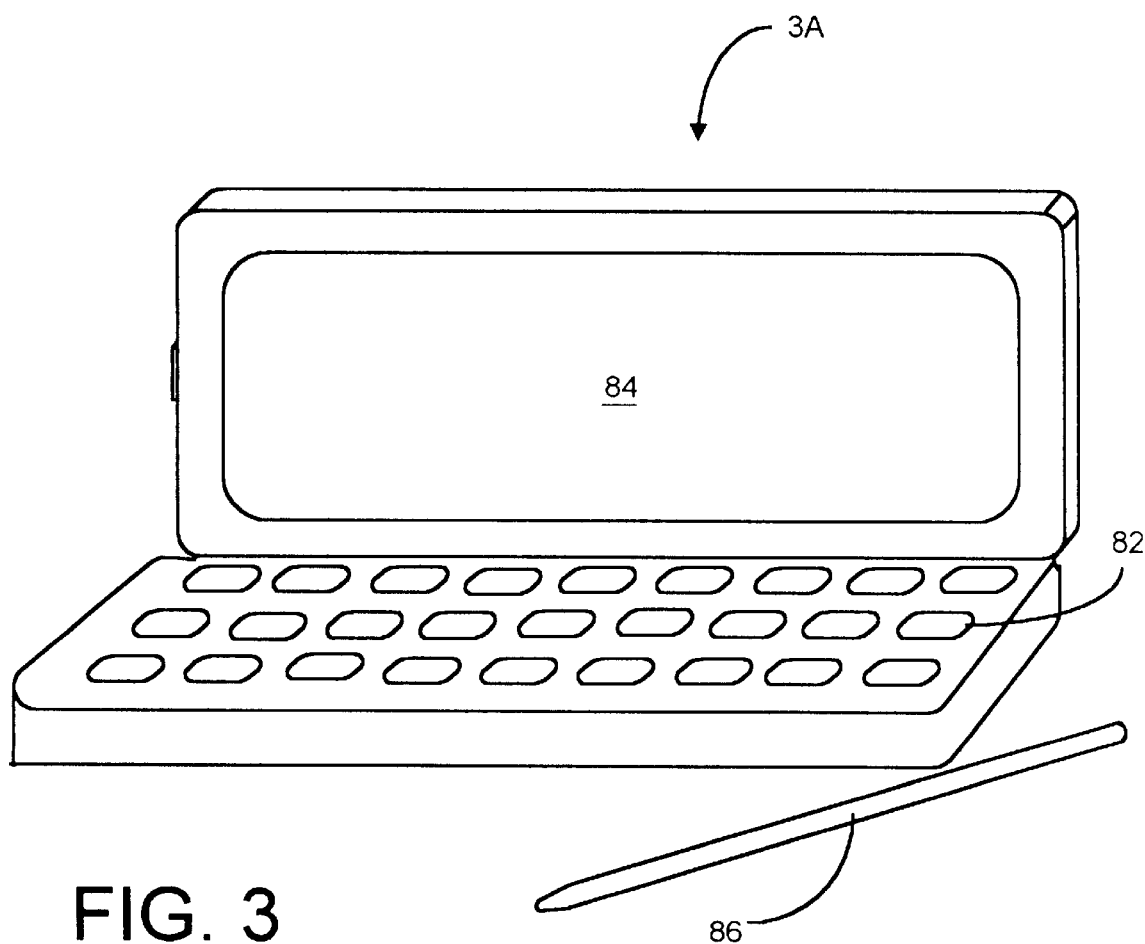
FIG. 3 is a simplified pictorial illustrating one embodiment of the mobile device in accordance with the present invention.
Figure 4:
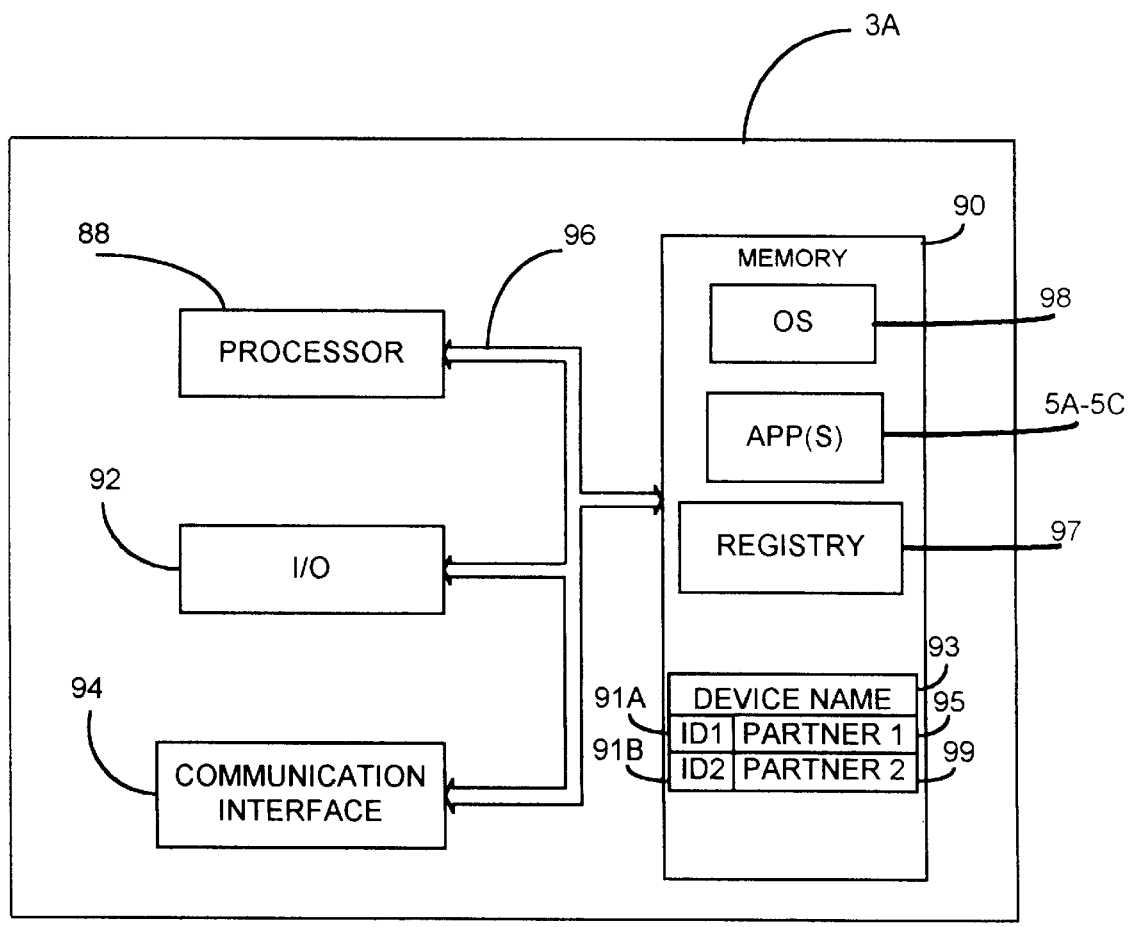
FIG. 4 is one embodiment of a simplified block diagram of the mobile device shown in FIG. 3.

FIGS. 2, 3 and 4 and the related discussion are intended to provide a brief, general description of a suitable computing environment in which the invention may be implemented. Although not required, the invention will be described, at least in part, in the general context of computer-executable instructions, such as program modules, being executed by the desktop computer 4 or the mobile devices 3A and 3B. Generally, program modules include routine programs, objects, components, data structures, etc., that perform particular tasks or implement particular abstract data types. Moreover, those skilled in the art will appreciate that the invention may be practiced with other computer system configurations, including other handheld devices, such as palmtop computers, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 2, an exemplary system for implementing the invention includes a general purpose computing device in the form of a conventional personal or desktop computer 4, including a computer processing unit (CPU) 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory 22 includes read only memory (ROM) 24 and random access memory (RAM) 25. A basic input/output system (BIOS) 26, containing the basic routine that helps to transfer information between elements within the desktop computer 4, such as during start-up, is stored in ROM 24. The desktop computer 4 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and the associated computer-readable media provide non-volatile storage of computer readable instructions, data structures, program modules and other data for the desktop computer 4.

Although the exemplary environment described herein employs the hard disk, the removable magnetic disk 29 and the removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more of the application programs 7A–7D, other program modules 37, and program data 38. A user may enter commands and information into the desktop computer 4 through input devices such as a keyboard 40, a pointing device 42 and a microphone 43. Other input devices (not shown) may include a joystick, game pad, satellite dish, scanner, or the like. These and other input devices are often connected to the processing unit 21 through a serial port interface 46 that is coupled to the system bus 23, but may be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers may typically include other peripheral output devices, such as a speaker and printers (not shown).

The desktop computer 4 may operate in a wired or wireless networked environment using logic connections to one or more remote computers, such as a remote computer 49. The remote computer 49 may be another personal computer, a server, a router, a network PC, a peer device or other network node, and typically includes many or all of the elements described above relative to the desktop computer 4, although only a memory storage device 50 has been illustrated in FIG. 2. The logic connections depicted in FIG. 2 include a local area network (LAN) 51 and a wide area network (WAN) 52. Such networking environments are commonplace in offices, enterprise-wide computer network Intranets and the Internet.

When used in a LAN networking environment, the desktop computer 4 is connected to the local area network 51 through a network interface or an adapter 53. When used in a WAN networking environment, the desktop computer 4 typically includes a modem 54 or other means for establishing communications over the wide area network 52, such as the Internet. The modem 54, which may be internal or external, is connected to the system bus 23 via the serial port interface 46. In a network environment, program modules depicted relative to the desktop computer 4, or portions thereof, may be stored in the remote memory storage devices, not shown. It will be appreciated that the network connections shown are exemplary and other means of establishing a communication link between the computers may be used. In one form of connection, the mobile device 3A can connect to the desktop computer 4 through the serial port interface 46.

The desktop computer 4 runs an operating system that is stored in any of the memory storage devices illustrated in FIG. 2 and executes on the processing unit 21. One suitable operating system is a Windows brand operating system sold by Microsoft Corporation, such as Windows 95 or Windows NT, or other derivative versions of Windows brand operating systems, or another suitable operating system. Other suitable operating systems include systems such as Macintosh OS sold by Apple Corporation, and the OS/2 Presentation Manager sold by International Business Machines (IBM).

FIG. 3 is a pictorial illustration of one preferred embodiment of the mobile device 3A which can be used in accordance with the present invention. The mobile device 3A, in one embodiment, is a desktop assistant sold under the designation H/PC. The mobile device 3A has some components which are similar to those of the desktop computer 4. For instance, in one embodiment, the mobile device 3A includes a miniaturized keyboard 82, a display 84 and a stylus 86. The display 84 can be a LCD display having a contact-sensitive screen used in conjunction with the stylus 86. The stylus 86 is used to press or contact the display 84 at designated coordinates to accomplish certain user input functions. Of course, other configurations could be used as well. For example, user input mechanisms could be included such as a keypad, a track ball, and various types of miniaturized keyboards, or the like. In addition, the mobile device 3A may not be embodied as the H/PC brand of desktop assistant, but could also be implemented as another type of personal digital assistant (PDA), another personal organizer, a palmtop computer, a similar computerized notepad device, a phone or a pager.

FIG. 4 is a more detailed block diagram of the mobile device 3A. The mobile device 3A preferably includes a microprocessor 88, memory 90, input/output (I/O) components 92 (which include the keyboard 82, and the touch sensitive display 84 and a communication interface 94 for the communication link 9). In one embodiment, these components are coupled for communication with one another over a suitable bus 96. The memory 90 can be implemented as non-volatile electronic memory such as a random access memory (RAM) with a battery back-up module (not shown) such that information stored in the memory 90 is not lost when the general power to mobile device 3A is shut down. A portion of memory 90 is preferably allocated as addressable memory for program execution, while the remaining portion of memory 90 is preferably used to simulate storage on a disk drive where memory 90, of course, can function as the store 6 in FIG. 1.

Memory 90 includes an operating system 98 and the application programs 5A–5C. The operating system 98, during operation, is preferably executed by the microprocessor 88. The operating system 98, in one embodiment, is the Windows CE brand operating system commercially available from Microsoft Corporation. The operating system 98 is preferably designed for mobile devices. The objects in the store 6 are preferably maintained by the application programs 5A–5C and the operating system 98, at least partially in response to calls to the exposed application program interfaces and methods. The application programs 5A–5C are not necessarily designed to be entirely compatible with corresponding application programs 7A–7D which execute on the desktop computer 4. For instance, there may not be precise one-to-one matching between the properties of specific object types.

In addition to the application programs 5A–5C and the operating system 98, memory 90 further stores a registry 97 used in operating systems such as Windows CE brand operating systems. The use of registries such as the registry 97 is conventional and provides information related to the application programs 5A–5C installed on the mobile devices 3A and 3B. In a preferred embodiment, the registry 97 stores user settings of the application as well as where particular files are to be stored in tree-type directories, which is a common technique used in many operating systems. For particular use in the present invention, the memory 90 further stores the identifiers at 91A and 91B. The identifiers are preferably unique for each partnership formed between the mobile device 3A and partnered computers, such as the desktop computer 4. By making the identifiers stored at 91A and 91B unique for each partnership formed, the mobile device 3A or 3B can have many partnerships with the desktop computer 4 for different uses.

In one embodiment, the identifier stored at 91A corresponds to one of the profile areas 13A or 13B in the desktop computer 4, while the identifier stored at 91B corresponds to a profile area in another desktop computer. In a further embodiment, the mobile device 3A also stores a "Device Name" at 93 given by the user, as well as names at 95 and 99 of one or more desktop computers 4 that the mobile device 3A has been partnered with. If desired, this information can be stored in a part of the registry 97 or stored separately from the registry 97. In one embodiment, the desktop computer 4 stores similar information, including the name of the desktop computer 4, and for each partnership, the identifiers at 15A and 159 and the respective device names at 16A and 16B of each partnered mobile device 3A or 3B.

FIG. 5 illustrates various communication links that can be formed with the present invention. In FIG. 5, the mobile device 3A is shown as a local device. As used herein, "local" means that the user can directly interact with the desktop computer 4 while the mobile device 3A is connected. In other words, the user can use suitable interfaces provided on the desktop computer 4 such as the monitor 47, keyboard 40 or pointing device 42, as illustrated in FIG. 2, when the mobile device 3A is connected.

In contrast, the mobile device 3B is illustrated as a remote device. As used herein, "remote" means that the user is unable to interact directly with the desktop computer 4 using its interfaces (the monitor 47, the keyboard 40, etc. as illustrated in FIG. 2), while the mobile device 3B is connected. In FIG. 5, the mobile device 3A can communicate with the desktop computer 4 via the serial connection 115, an infrared link 117, or over a direct LAN connection 119 and over a network 123 (for example, where the user has a second network connection close to the desktop computer 4). In contrast, the mobile device 3B can communicate remotely with the desktop computer 4 through a direct LAN connection 121 (for example, where the mobile device 3B connects to the network 123 remote from the desktop computer 4 such as in a conference room). The mobile device 3B can also communicate with the desktop computer 4 through a modem 127 and a variety of modem links. For example, the modem 127 can communicate with a modem 129 directly coupled to the desktop computer 4. Alternatively, the modem 127 can communicate through a modem 131 that accesses the network 123 through a remote access server (RAS) 133. In yet a further embodiment, the modem 127 can communicate with a modem 135 providing access to a wide area network 137, such as the Internet, wherein the network 123 includes a network gateway 139 also communicating with the wide area network 137. In yet a further embodiment, a remote connection to the desktop computer 4 can be obtained by remotely docking with another desktop system 143 connected to the network 123 such as through the serial connection 115.

Figure 11:
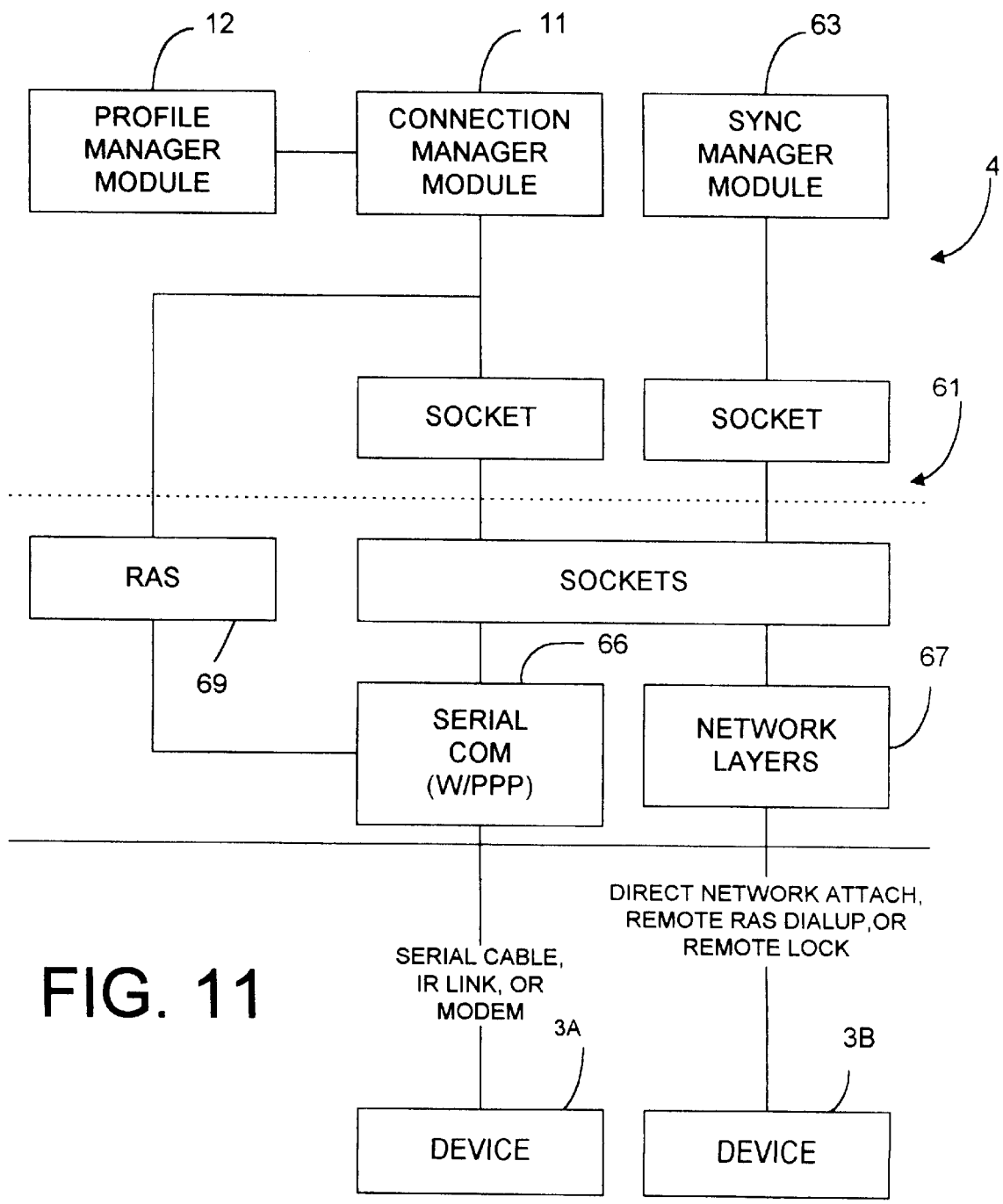
FIG. 11 is a simplified block diagram of a communication architecture of a desktop computer.

In a preferred embodiment, the desktop computer 4 uses a layered architecture based on the International Standards Organization Standardization (ISO) Model for computer networking, called the Open Systems Interconnect (OSI) reference model, and the Institute of Electrical and Electronic Engineers (IEEE) 802 Model. Suitable operating systems employing this type of layered architecture include Windows NT brand operating system and Windows 95 brand operating system by Microsoft Corporation. FIG. 11 illustrates a simplified block diagram of the desktop computer 4 using layered architecture. Sockets generally indicated at 61 allow the mobile devices 3A and 3B to communicate to programs such as the connection manager module 11, the profile manager module 12, and a sync manager module 63. The mobile devices can either communicate with the desktop computer 4 using serial communication layers 66, or through network layers 67. In the embodiment illustrated, to connect via the network layers 67, the desktop computer 4 is provided with TCP/IP networking Whereas, to connect via a serial port, the desktop computer 4 is provided with Remote Access Services (RAS) 69 (or their equivalent) and Point-to-Point Protocol (PPP). Generally, the sockets 61 and the RAS 69 are equivalent to the applications layer in the ISO standard while the other layers of the standard are represented by serial communication layers 66 and network layers 67. Use of this architecture is particularly advantageous since data transfer using any of the communication links illustrated in FIG. 5 is isolated from the program modules such as the connection manager module 11 and the profile manager module 12. This allows incorporation of any particular vendor's communication hardware since the program modules reed not be written for each specific hardware because the hardware has been designed to communicate as necessary in the communication layers. In this manner, as new communication links are developed, they can be easily used in the present invention. The mobile devices 3A and 3B also include a suitable architecture such as found in the Windows CE brand operating system by Microsoft Corporation.

Figure 7:
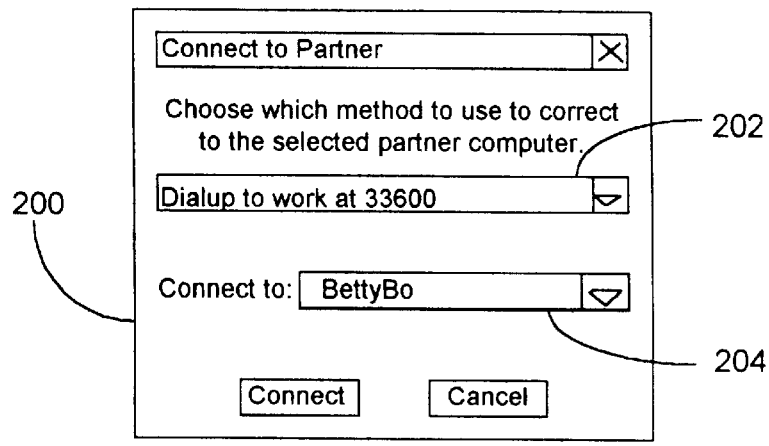
FIGS. 7–10 illustrate user interfaces provided to a user to set up connection parameters for connecting a mobile device to a desktop computer in accordance with one aspect of the present invention.
Figure 8:
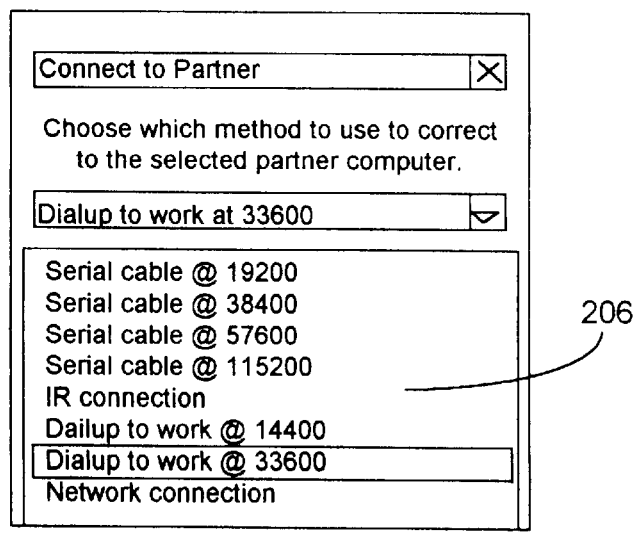
Figure 9:
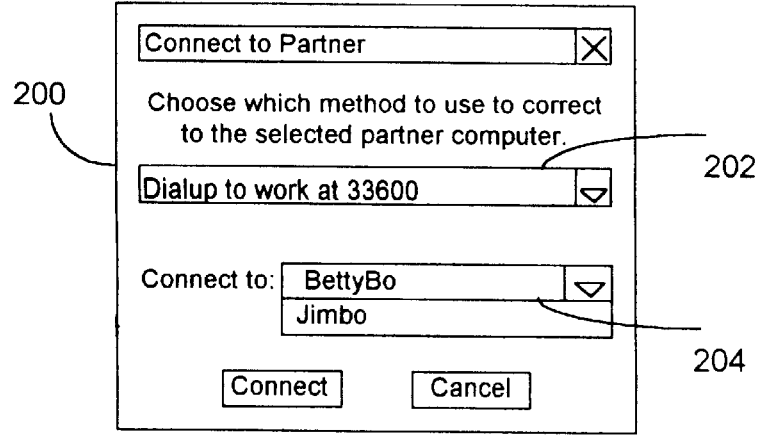

FIG. 6A is a flow diagram illustrating a process or system by which the mobile device, such as mobile device 3A establishes an appropriate connection with a partnered desktop computer 4. At the outset, the user of mobile device 3A must choose a type of communication link by which the connection is to be made (referred to herein as a "connectoid") and the name of the partnered desktop computer 4 to which the connection is to be made. In order to do this, the mobile device user is preferably provided with a series of user interfaces, preferred embodiments of which are illustrated in FIGS. 7, 8 and 9. The user interfaces of FIGS. 7–9 are provided through a suitable interactive program provided on the mobile device.

FIG. 7 illustrates that, when the user wishes to connect to a partnered desktop computer 4, interface 200 is displayed on mobile device 3A. Interface 200 allows the user of mobile device 3A to select the desired connectoid in field 202. User interface 200 also allows the user of mobile device 3A to select the name of the partnered desktop computer 4 to which the connection is to be made. This is provided in field 204. In the embodiment illustrated, the user is provided with a number of options in both fields 202 and 204. In addition, selected options in fields 202 and 204 can be retained and displayed as default choices for the next connection session.

For example, if the user desires to select the connectoid, the user simply actuates the appropriate button adjacent field 202 to open up a drop down menu 206 illustrated in FIG. 8. In the embodiment shown in FIG. 8, the user is provided with the ability to establish connection with the desired desktop computer 4 by serial cable, at one of a number of baud rates. In addition, the user is allowed to select infrared (IR) connection, a dial-up modem connection, or a network connection, if mobile device 3A is equipped with a network card.

The connection component in mobile device 3A, which is designated the task of setting up the connection, is preferably configured to detect whether mobile device 3A is fitted with a network card. If so, a network connection option is provided in drop down menu 206 for selection by the user. However, if mobile device 3A is not fitted with an appropriate network card the connection component in mobile device 3A will not permit that option to be displayed in drop down field 206.

Once the appropriate connectoid is chosen, the user is asked to choose the particular desktop computer to which the connection is desired. As with the connectoid, the user is preferably provided with a number of computer name options. For instance, by actuating the appropriate button adjacent field 204 in FIG. 7, the user can open a drop down field such as field 204 shown in FIG. 9. While any number of options can be provided, in one embodiment, only those computers with which mobile device 3A has established a partnership are listed in drop down field 204. In any case, the user selects the appropriate computer name and actuates the connect button illustrated in FIG. 7. Selection of the appropriate connectoid and "connect to" computer name, and actuation of the connect button is indicated by block 210 in FIG. 6A.

At this point, it should be noted that an automatic local connection can also be made without using the user interfaces illustrated in FIGS. 7–9. In particular, the mobile device 3A can be provided with a module that initiates communication with the desktop computer 4 when, for example, a serial connection is made and the connection manager module 11 is running on the desktop computer 4. In one mode, the connection manager module 11 can monitor the serial port used to form the connection. When the mobile device 3A is present, as signified by the mobile device 3A providing an identifier signal, the connection manager module 11 initiates communication. In another mode, the desktop 4 can assert an initial signal and the mobile device 3A can initiate communication. A suitable user interface on the mobile device 3A can be used to enable or disable automatic connection from the mobile device side.

Assuming that the user of mobile device 3A has selected a connection option, other than the network connection option (through a network card on mobile device 3A) the user is preferably provided, at the display of mobile device 3A, with an appropriate message, such as message 1 illustrated in Table 1 (FIG. 6C) which indicates that the connection is being established. In the embodiment illustrated, mobile device 3A then attempts to set up a point-to-point protocol (PPP) connection. This is indicated by block 212 in FIG. 6A. Other protocols can also be used.

If the PPP connection is not established, for any reason, the mobile device user is provided with message A which indicates that mobile device 3A was unable to establish the connection, and the session is terminated, as indicated by block 214. However, if mobile device 3A is successful in establishing the PPP connection, the user is preferably provided with a message, such as message 2, which indicates that a computer has been contacted, and that mobile device 3A is attempting to locate a connection manager, as indicated by block 216. If no connection manager is found, the mobile device user is preferably provided with a message indicating that no connection manager has been found, and that mobile device 3A is attempting to locate the selected partner desktop computer 4. This is indicated by block 218.

A particular advantage of the present invention is that local and remote connections of the mobile devices 3A and 3B are handled at the desktop computer 4 in a manner that is transparent to the user. For instance, if no connection manager is found at block 216, this may simply indicate that mobile device 3A has been connected to, for example, the RAS server 133 on the network 123 (FIG. 5) rather than through a direct serial connection to the desired desktop computer 4. Typically, the RAS server 133 is not provided with a connection manager since it has not been partnered with any mobile devices. However, when the mobile device 3A has been connected to a computer other than the desired computer, the system will continue to look for the desired computer, for example, through the network 123 without any further action by the user. Assuming that mobile device 3A is connected to a computer which Includes a connection manager, it is then determined whether serial connections are enabled in that computer. This is indicated by block 220.

In the preferred embodiment, a user of the desktop computer 4 is allowed to select certain properties associated with the connection of mobile devices. This is preferably done from desktop computer 4. In order to set those properties, the desktop user is provided with a suitable user interface, such as that illustrated in FIG. 10. User interface 222 in FIG. 10 preferably allows the desktop user a number of options. For example, the desktop user can be allowed to disable all connections from any mobile device simply by selecting option 224 on user interface 222. This option may be exercised, for example, where the user does not wish to allow data on that desktop computer to be synchronized with any mobile device.

The desktop user is also preferably provided with an option to either enable or disable device connections via a serial port, or to specify the particular serial port by which the connections are to be made. This is indicated by options 226, 228 and 230 in FIG. 10. Of course, in the preferred embodiment, the user is preferably provided with a plurality of options specified in the particular port and baud rate through which connections are to be made. Also, the desktop user is preferably provided with an option to either enable or disable connections with mobile devices through the network 123. In order to do this, the user simply selects option 232 in user interface 222. If desired, the user interface can be constructed so as to allow the desktop computer user to individually enable or disable each type of connection in addition to, or in the alternative to the serial and network selections shown. For instance, the user interface could provide the desktop computer user with an option disabling network connections from the RAS server, but allowing other forms of network connections in order to prevent access to the desktop 4 through outside modems.

Referring again to FIGS. 6A and 6B, and assuming that, at block 220, serial connections are not enabled, the mobile device user is provided with messages, such as message C and message 4 from Table 1 (FIG. 6C) indicating that serial connections have been disabled on the particular desktop computer 4, and further indicating that mobile device 3A is now attempting to locate the desired desktop computer 4 using the network 123. This is indicated by block 234. In that instance, further processing is discussed below.

If, at block 220, serial connections are enabled at the particular desktop computer with which mobile device 3A is then communicating, the serial connection is established with that desktop computer. Then, it is determined whether that particular desktop computer has been partnered with mobile device 3A, and an appropriate message is displayed. This is indicated by block 236. If no partnership is found, then mobile device 3A may be currently connected to a desktop computer 4 in FIG. 5, but not the particular destination desktop computer 143 with which it desires to be connected or has formed a partnership. In that instance, the user is provided with an appropriate message, and an effort is made to locate the correct destination desktop computer 143 through the network 123. This is indicated by block 233. At that point, processing continues as described below with respect to connection via the network 123.

If, at block 236, it is determined that mobile device 3A is partnered with the desktop computer 4 to which it is then connected, the desktop computer 4 is preferably configured to determine whether the device name stored at 93 (FIG. 4) of mobile device 3A has been changed and whether the new name is unique. In other words, in order for the partnership relationship to be found, it is only necessary that the identifier 91A (FIG. 4) (in one embodiment, a 32 bit identifier) associated with mobile device 3A must match the identifier stored at 15A or 15B Located in the partnership information 10 on desktop computer 4. However, as is discussed above, the mobile device user can assign a device name to mobile device 3A, which is stored at 16A or 16B on the desktop computer 4 as well. Also, the user of mobile device 3A can preferably change the device name stored at 93 without interacting with desktop computer 4. However, in order to avoid user confusion, desktop computer 4 preferably does not allow the mobile device user to change the device name 16A of mobile device 3A to a name which already corresponds to any other partnership on desktop computer 4. If the user has changed the name of mobile device 3A, and if that name is not unique, in the embodiment illustrated, the connection is terminated and an appropriate message is displayed to the user of the mobile device. This is indicated at blocks 240 and 242. If desired, rather than dropping the connection, the desktop user can be provided with a suitable user interface to allow the device name stored at 93 to be changed (if it is a local connection).

If it is determined, at block 240, that the user has changed the device name and the new name is unique, then the desktop computer 4 modifies the partnership information at 16A or 16B on desktop computer 4 to reflect the new name. Once it is determined that the device name is unique, the connection is then established and appropriate services at the desktop computer 4 can be utilized by the user of mobile device. This is indicated by block 244.

If processing flow leads to any of blocks 218, 234 and 238, that means that mobile device 3A has indeed been connected to another computer, but the specific connection with the desired desktop computer 4 or 143 has not been established. Rather than simply terminating the connection, the system attempts to search the remainder of the network 123 to which mobile device 3A is connected in order to locate the desired desktop computer 4 or 143. Therefore, the computer to which mobile device 3A is then connected is directed to attempt to locate a naming service on the network 123 in order to identify the address of the desired desktop computer 4 or 143. This is indicated by block 246. It should be noted that if the mobile device 3A has more than one stored partnership identifier and name, each possible partnership can be checked. If either a naming service is not found, or the naming service is found, but the IP address for the desired desktop computer 4 or 143 is not located in the naming service, it is determined that the desired desktop computer 4 or 143 is not accessible to mobile device 3A using the current connection, and the connection is terminated. An appropriate message is then displayed for the mobile device user. This is indicated by block 248.

However, if, at block 246, a naming service is located, and the IP address for the desired desktop computer 4 or 143 is found in that naming service, it is preferably displayed for the mobile device user with an appropriate message. Connection with the desired desktop computer 4 or 143 is then attempted. In order to do this, it is first determined whether the desired desktop computer 4 or 143 is equipped with a connection manager. This is indicated by block 250. If not, the connection is again terminated and the mobile device user is preferably provided with a suitable message. This is indicated by block 252.

Figure 10:
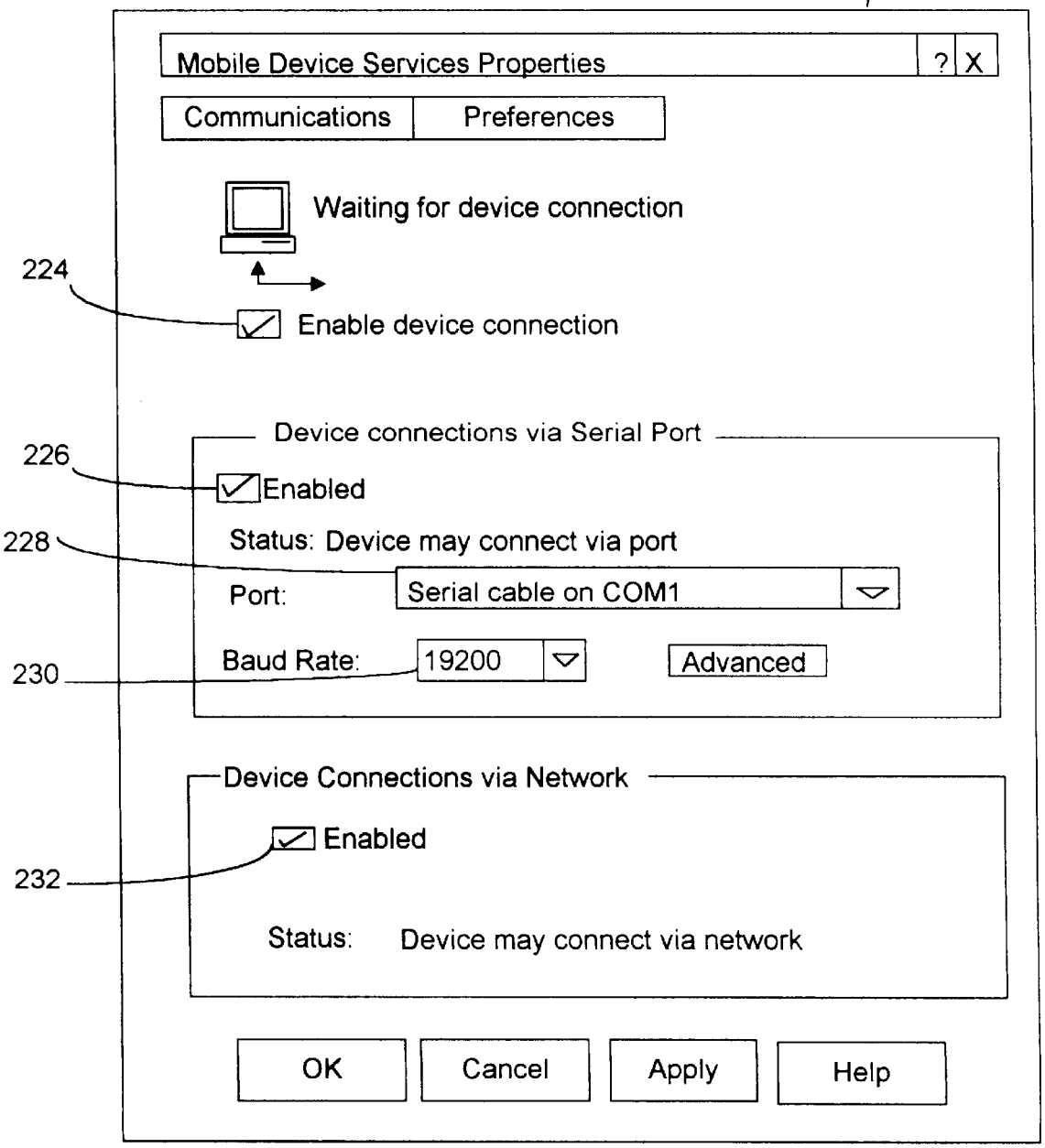

On the other hand, if the desired desktop computer 4 is equipped with a connection manager, then it is determined whether network connections are enabled (recall that such connections can be enabled or disabled such as through use of user interface 222 shown in FIG. 10). This is indicated by block 254. If network connections have been disabled, the connection is terminated and an appropriate message is displayed. This is indicated by block 256.

If the network connections are enabled, the identifiers stored at 91A and 91B of mobile device 3A are compared with the identifiers stored at 15A and 15B in the partnership information 10 on the desktop computer 4. This is indicated by block 258. If no partnership is found, the connection is again terminated and an appropriate message is displayed. This is indicated by block 260.

If, at block 258, a partnership is found, the device name stored at 93 is checked to see whether it has been changed and whether it is unique, as described with respect to block 240. This is indicated by block 262. If the device name 16A is not unique, in the embodiment illustrated, the connection is dropped at block 242.

Figure 6B:
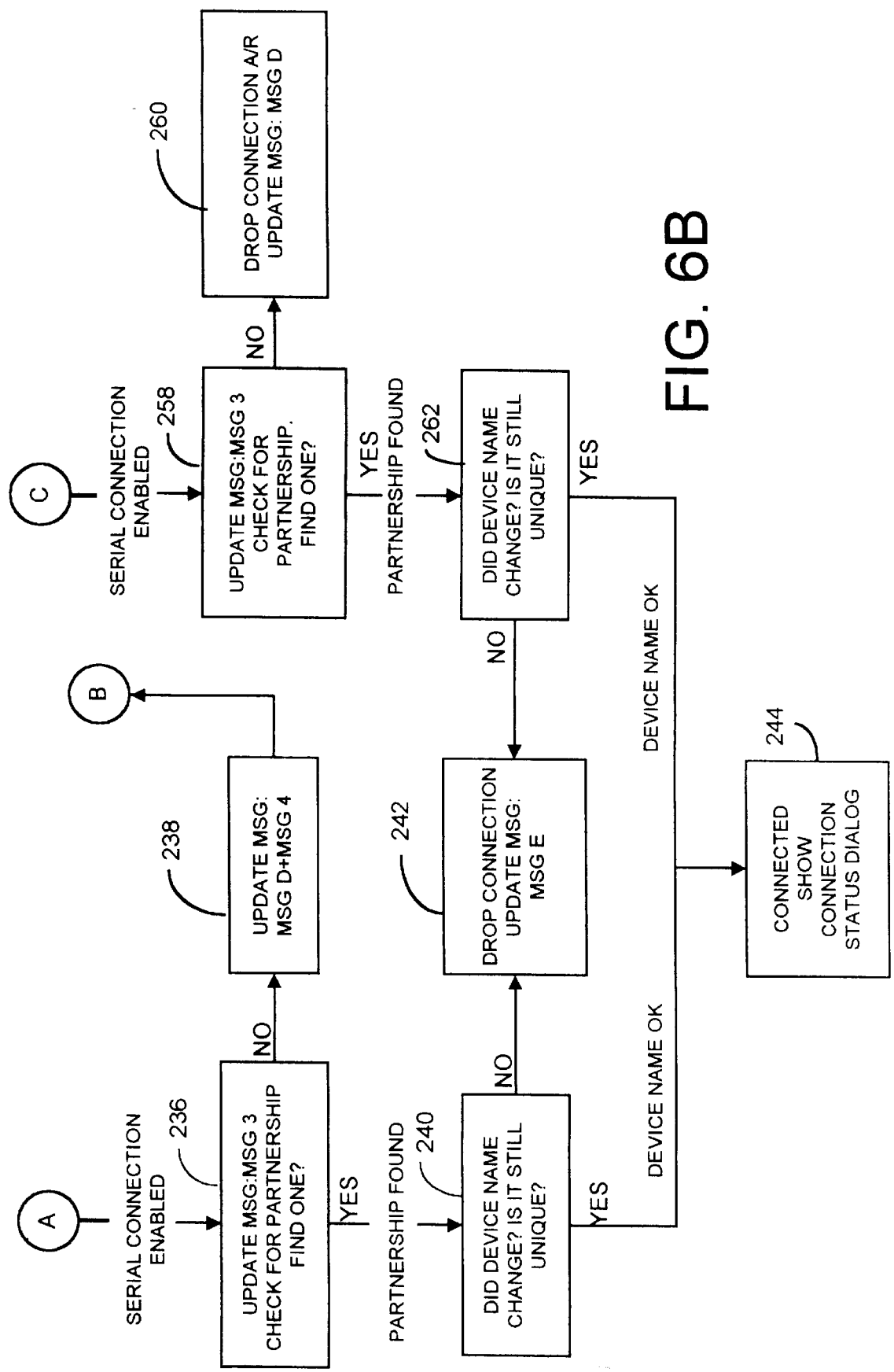

The processing flow set out in FIGS. 6A and 6B has been described, thus far, with respect to a user of mobile device 3A who is attempting co connect with a partner desktop computer 4 through a connection mechanism, other than through a network card. Recall that if mobile device 3A is equipped with a network card, the user can specify connection through that mechanism as well. Such a selection is detected at block 210, and an appropriate message is displayed at block 264. Processing flow then enters block 246 and proceeds as discussed above.

It should be noted that, when mobile device 3 is directly connected to desktop computer 4 in a "local" configuration, such that the user of mobile device 3A can directly access desktop computer 4, the user may be provided with certain user interfaces, such as error messages, at desktop computer 4 to direct some portions of the interaction between mobile device 3A and desktop computer 4. For example, during synchronization, objects stored on the store 6 in mobile device 3A are synchronized with objects stored in the store 8 of desktop computer 4 such that both stores contain up-to-date objects. However, during the process, certain user interfaces may be displayed for the user at desktop computer 4. For instance, during synchronization, one instance of an object stored on desktop computer 4 may have been modified by a user of desktop computer 4. Another instance of that same object stored on mobile device 3A may have also been modified. Depending on the settings stored in the partnership information 10, the user may be prompted at desktop computer 4 to resolve such a conflict. In other words, the user may be asked whether the object from mobile device 3A should take precedence, or the object from desktop computer 4. The user simply chooses which object should take precedence and the synchronization protocol proceeds accordingly.

However, where the mobile device is "remotely" connected to desktop computer 4, such that the user of mobile device 3A does not have access co desktop computer 4 to view and interact with the desktop interfaces, a number of actions are preferably taken. First, in one embodiment, the desktop interfaces are suppressed at desktop computer 4 such that they are not displayed at all. A set of default parameters is preferably utilized by desktop computer 4 instead of the user input which would otherwise be received through the desktop interface. However, in certain instances, such as where conflicts arise during synchronization, there may be no universal default parameter desired by the user. In other words, the user may not wish to have either the desktop computer, or the mobile device, take precedence in all instances. In the example where a synchronization conflict arises, the object which is the subject of the conflict is simply not synchronized.

In addition, if mobile device 3A is connected to desktop computer 4 using a communication link that is presumed to be remote (for example, through a network card), but for some reason the user of mobile device 3A also interacts with the desktop computer 4 (for example, interacts with other user interface boxes), suppression of the user interfaces pertaining to the mobile device 3A are suspended for the duration Of the connection, or the user is given an option to suspend them. If unsuppressed, the user interfaces will appear just as if the mobile device had been directly connected to desktop computer, such as through a serial cable connection In a further embodiment, the suppressed user interfaces for the desktop computer 4 can be provided to and remotely displayed on the mobile device 3A.

Although the present invention has been described with reference to preferred embodiments, workers skilled in the art will recognize that changes may be made in form and detail without departing from the spirit and scope of the invention.

What is claimed is:

1. A method of interaction between a computer and a mobile device, the method comprising:

storing an identifier on the mobile device and the computer;

storing a set of settings on the computer referenced to the identifier on the mobile device;

selecting a connection method on the mobile device from a plurality of connection methods;

forming the connection between the mobile device and the computer pursuant to the selected connection method;

comparing the identifier stored on the mobile device with the identifier stored on the computer upon connection of the mobile device to the computer;

controlling Interaction between the mobile device and the computer as a function of the stored set of settings if corresponding identifiers are found; and suppressing user interfaces at the computer if the connection is a remote connection.

2. The method of claim 1 wherein the plurality of connection methods include a local connection.

3. The method of claim 1 wherein the plurality of connection methods include a remote connection.

4. The method of claim 1 and further comprising displaying the plurality of connection methods on the mobile device.

5. The method of claim 1 and further comprising selecting the computer from a plurality of computers to connect to.

6. The method of claim 1 wherein the user interfaces comprise error messages.

7. The method of claim 1 and further comprising detecting user interaction with the computer and unsupressing user interfaces upon detection of user interaction.

8. The method of claim 7 and further comprising:

storing a set of default parameters on the computer; and using the set of default parameters in place of user input.

9. A method of interaction between a first computer and a mobile device, the first computer being connected to a second computer, the method comprising:

storing an identifier on the mobile device and the first computer;

storing a set of settings on the first computer referenced to the identifier on the mobile device;

connecting the mobile device to the second computer;

ascertaining if a partnership exists between the mobile device and the second computer, if no partnership exists with the second computer, searching for the first computer;

communicating between the mobile device and the first computer through the second computer; and controlling interaction between the mobile device and the first computer as a function of the stored respective set of settings.

10. The method of claim 9 wherein the first computer and the second computer are a part of a network.

11. The method of claim 9 wherein the set of settings include values indicating allowed types of local and remote connections.

12. The method of claim 11 wherein the set of settings include a value indicating whether a network connection is allowed.

13. The method of claim 12 wherein the set of settings include a value indicating whether a serial connection is allowed.

14. The method of claim 9 wherein the set of settings include a value indicating whether any form of connection is allowed.

15. An interactive computer system comprising:

a mobile device having an identifier stored thereon;

a computer having a layered architecture communications interface for selectively coupling to the mobile device for communication therewith, the layered architecture communications interface being adapted to form a remote connection and a local connection, and wherein the computer includes a set of settings referenced to the identifier, the computer comparing the identifier stored on the mobile device with the identifier stored on the computer upon connection of the mobile devices to the computer, and controlling interaction between the connected mobile device and the computer as a function of the stored set of settings if corresponding identifiers are found, and wherein the computer suppresses displaying user interfaces when a remote connections is formed.

16. The system of claim 15 wherein the computer is connected to a network and the computer includes means for selectively allowing connection of the mobile device to the computer through the network.

17. The system of claim 15 wherein the computer is connectable to the mobile device through a serial connection, and the computer includes means for selectively allowing connection of the mobile device to the computer through the serial connection.

18. The system of claim 17 wherein the computer is connected to a network and the computer includes means for selectively allowing connection of the mobile device to the computer through the network.

19. The system of claim 15 wherein the mobile device includes means for selecting the computer from a plurality of computers.

20. The system of claim 15 wherein the mobile device includes means for selecting a connection method from a plurality of connection methods.

21. The system of claim 15 wherein the computer detects user interaction and unsupresses user interfaces upon detection of user interaction.

22. The system of claim 15 wherein the computer stores a set of default parameters and uses the set of default parameters in place of user input.

23. A method for providing flexible communication connections between a computer and a mobile device, wherein the computer and the mobile device have established a prior partnership, the method comprising:

selecting via the mobile device a communication method for connecting the computer and the mobile device, the communication method selected from a plurality of methods including both remote and local connections;

selecting a computer from a list of computers having a partnership with the mobile device;

determining whether a connection to the selected computer exists, and if so, invoking the selected communication method; and suppressing user interfaces on the computer when the selected communication method is a remote connection.

24. The method of claim 23 and further comprising verifying that a partnership exists between the selected computer and the mobile device.

25. The method of claim 23 and further comprising suppressing error messages on the computer when the selected method is a remote connection.

26. The method of claim 23 wherein the step of determining includes accessing an intermediate computer connected to the selected computer.

27. The method of claim 23 wherein the step of selecting a communication method includes determining if a particular communication method is available and if the particular method is available, automatically providing the particular method as an option.

28. The method of claim 15 wherein the step of determining includes accessing a network to which the selected computer is connected.

29. The method of claim 23 wherein the user interfaces comprise error messages.

30. The method of claim 23 and further comprising detecting user interaction with the computer and unsupressing user interfaces upon detection of user interaction.

31. The method of claim 23 and further comprising:

storing a set of default parameters on the computer; and using the set of default parameters in place of user input.

* * * * *

UNITED STATES PATENT AND TRADEMARK OFFICE
CERTIFICATE OF CORRECTION

PATENT NO.   : 6,128,661
DATED        : October 3, 2000
INVENTOR(S)  : Flanagin et al.

Page 1 of 1

It is certified that error appears in the above-identified patent and that said Letters Patent is hereby corrected as shown below:

Column 8,
Line 2, change "159" to -- 15B --.

Column 9,
Line 8, change "reed" to -- need --.

Column 10,
Line 65, change "Includes" to -- includes --.

Column 11,
Line 56, change "233" to -- 238 --.

Column 12,
Line 1, change "Located" to -- located --.

Column 13,
Lines 16 and 51, change "co" to -- to --.

Column 14,
Line 6, change "Of" to -- of --.
Line 33, change "Interaction" to -- interaction --.

Column 15,
Line 31, change "devices" to -- device --.
Line 36, change "connections" to -- connection --

Column 16,
Line 39, change "15" to -- 23 --.

Signed and Sealed this

Thirteenth Day of November, 2001

Attest:

*Nicholas P. Godici*

NICHOLAS P. GODICI
*Attesting Officer*      *Acting Director of the United States Patent and Trademark Office*